(12) United States Patent
Dirr

(10) Patent No.: US 7,027,525 B2
(45) Date of Patent: Apr. 11, 2006

(54) DIGITAL TRANSMISSION METHOD FOR BANDWIDTH AND BIT RATE FLEXIBILITY

(76) Inventor: Josef Dirr, Neufahrner Strasse 5, 81679 Munich (DE)

( * ) Notice: Subject to any disclaimer, the term of this patent is extended or adjusted under 35 U.S.C. 154(b) by 358 days.

(21) Appl. No.: 10/130,450

(22) PCT Filed: Dec. 1, 2000

(86) PCT No.: PCT/EP00/12058

§ 371 (c)(1),
(2), (4) Date: Jul. 16, 2002

(87) PCT Pub. No.: WO01/43385

PCT Pub. Date: Jun. 14, 2001

(65) Prior Publication Data

US 2003/0076897 A1 Apr. 24, 2003

(30) Foreign Application Priority Data

| Dec. 7, 1999 | (DE) | ................................ 199 58 922 |
| Oct. 5, 2000 | (DE) | ................................ 100 49 339 |

(51) Int. Cl.
*H04L 27/20* (2006.01)

(52) U.S. Cl. ...................... 375/308; 375/302; 375/239; 375/259; 375/353; 370/295; 370/282; 358/426.13

(58) Field of Classification Search ................ 375/308, 375/239, 259, 376, 329, 304, 353; 358/426.13; 331/2, 1 A; 370/295, 282
See application file for complete search history.

(56) References Cited

U.S. PATENT DOCUMENTS

| 4,965,533 A | * | 10/1990 | Gilmore ....................... 331/18 |
| 5,072,195 A | * | 12/1991 | Graham et al. ................. 331/2 |
| 5,323,424 A | * | 6/1994 | Fazel et al. ................... 375/329 |
| 5,329,251 A | * | 7/1994 | Llewellyn ....................... 331/2 |
| 5,463,351 A | * | 10/1995 | Marko et al. ................. 331/1 A |
| 5,576,835 A | * | 11/1996 | Dirr ....................... 358/426.13 |
| 5,581,368 A | * | 12/1996 | Dirr ....................... 358/426.13 |
| 5,587,797 A | * | 12/1996 | Dirr ....................... 358/426.13 |
| 5,610,558 A | * | 3/1997 | Mittel et al. .................... 331/2 |

(Continued)

FOREIGN PATENT DOCUMENTS

DE 3831054 3/1990

(Continued)

OTHER PUBLICATIONS

Copy of the International Search Report dated Mar. 16, 2001.

*Primary Examiner*—Shuwang Liu
*Assistant Examiner*—Eva Zheng
(74) *Attorney, Agent, or Firm*—Nields & Lemack

(57) ABSTRACT

The invention relates to AC coding. The phase angle or the duration of pulses are marked by half-periods or periods and are then provided as stages. The aim of the present invention is to flexibly adjust the bandwidths and bit rates. The number of filler elements that are allocated to the active code elements is increased or reduced. Bit rate flexibility is obtained by increasing or reducing the positions or stages or by configuring the code elements of virtual code words in a serial manner in relation to code words for transmitting information, whereby said code elements are arranged in parallel.

8 Claims, 3 Drawing Sheets

U.S. PATENT DOCUMENTS

| | | | |
|---|---|---|---|
| 5,631,090 A * | 5/1997 | Fukui et al. | 428/469 |
| 5,909,474 A * | 6/1999 | Yoshizawa | 375/376 |
| 6,072,829 A * | 6/2000 | Dirr | 375/239 |
| 6,215,835 B1 * | 4/2001 | Kyles | 375/376 |
| 6,463,104 B1 * | 10/2002 | Dirr | 375/259 |

FOREIGN PATENT DOCUMENTS

| | | |
|---|---|---|
| DE | 19743779 | 8/1998 |
| WO | 98/14042 | 4/1998 |
| WO | 99/12318 | 3/1999 |

* cited by examiner

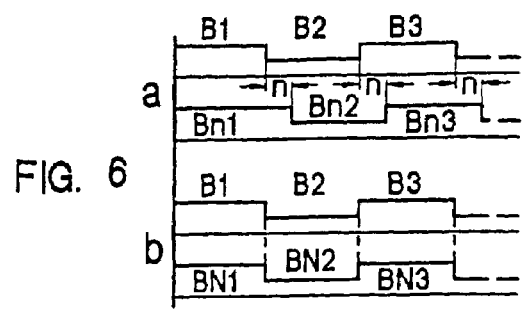
FIG. 6
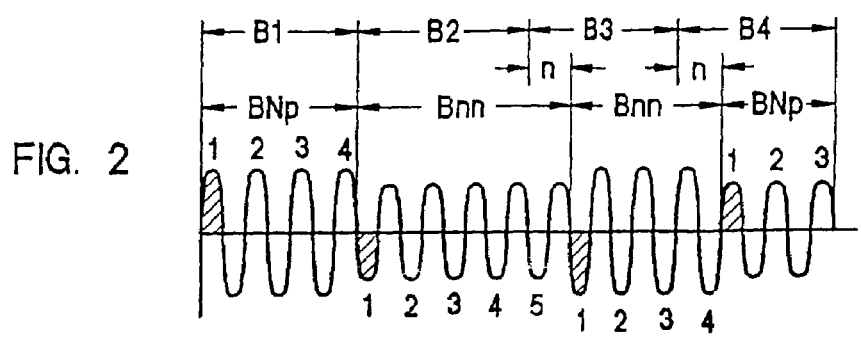
FIG. 2
FIG. 4
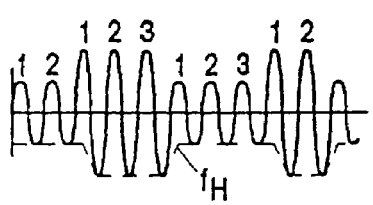
FIG. 3
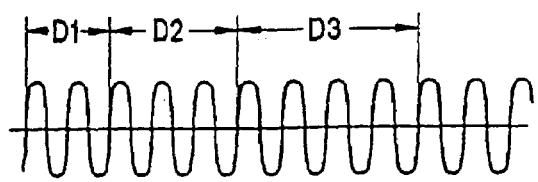
FIG. 5
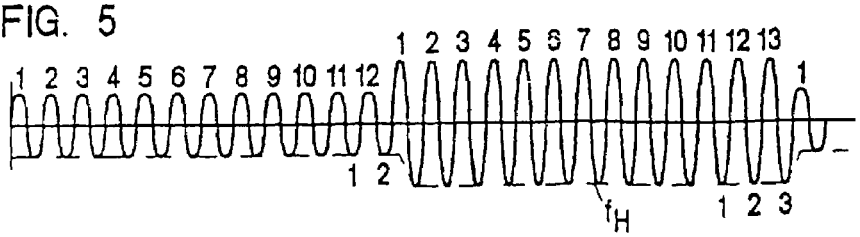

$$u_{AM}(t) = \hat{u}_T \cdot \sin\omega_T t + \frac{m}{2} \cdot \hat{u}_T \cdot \cos(\omega_T - \omega_M)t - \frac{m}{2} \cdot \hat{u}_T \cdot \cos(\omega_T + \omega_M)t$$

DIGITAL TRANSMISSION METHOD FOR BANDWIDTH AND BIT RATE FLEXIBILITY

This application is a 371 of PCT/EP00/12058 filed on Dec. 1, 2000.

TECHNICAL FIELD

The present invention is concerned with the digital transmission of information, especially various types of information over only one transmission path, such as cable, radio or light waveguides.

BACKGROUND OF THE INVENTION

In order to send various types of information (such as high speed data, data, digital speech) over only one transmission channel, the Asynchronous Transfer Mode (ATM) was developed in which the useful and control information of a source are arranged in cells in a packeting device and provided with a header. In asynchronous time multiples, the various types of information are transmitted over one transmission path. The expenditure of hardware for this technology is very great. Cell overhauling required additional resequencing mechanisms, for example. Since a header must be provided for each cell, a great part of the transmission capacity is already used for this.

SUMMARY OF THE INVENTION

In accordance with the invention, serial channels are constructed out of each binary code element of the code words to be transmitted (virtual code words), in which the channels are provided binary coded code words of the respective information.

BRIEF DESCRIPTION OF THE DRAWINGS

FIGS. 2, 3 and 6 show the principle of phase and duration pulse coding,

FIGS. 4, and 5 show the principle of the envelope curves and with a smooth amplitude transition.

The principle of the invention will be explained in more detail with reference to FIG. 1. The binary arranged code words I, II, III, IV, I, II, . . . , designated as virtual code words, are transmitted with any desired code over cable, radio or light wave guides. For the encoding, there can be provided a PSK or QAM code, or a code in which only one alternating current of one frequency and phase is sent in an unbroken sequence. This will be described hereinafter with reference to FIGS. 2, 3 and 6. In FIG. 1, serial channels 1–12 are constructed out of the binary code elements 1p–12p. The binary coded information to be transmitted is arranged serially in the channels, e.g. an 8 bit pickup of a speech channel with the code elements I/1p-II/1p-III/1p-IV/1p-I/1p-II/1p-III/1p-IV/1p.

Figure 1:
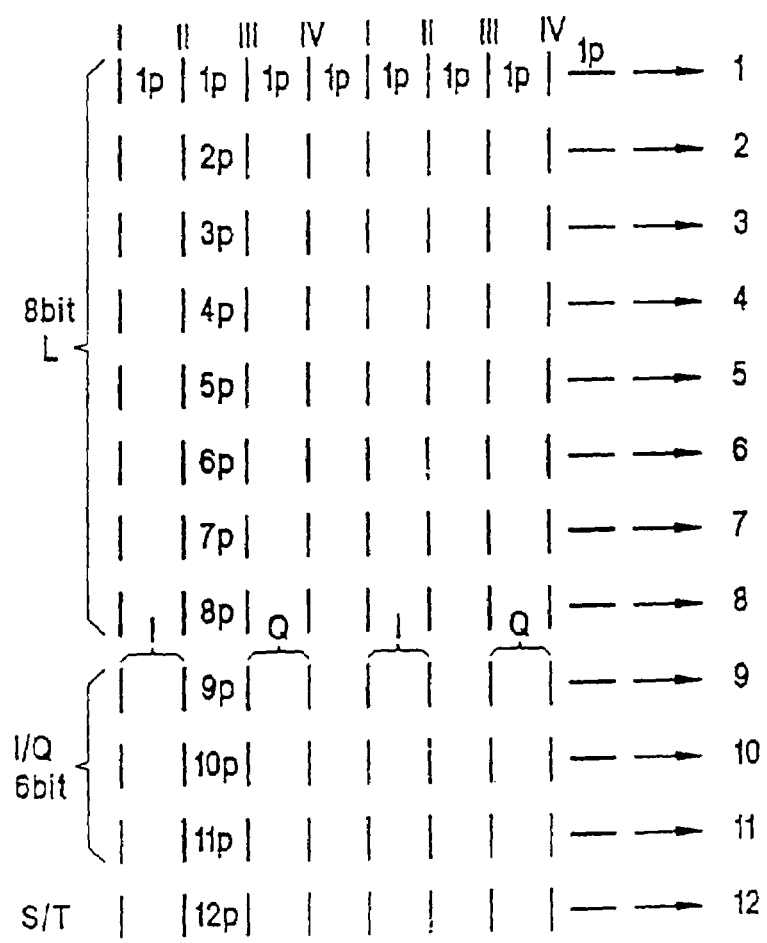
FIG. 1 represents an arrangement of the virtual code words (I, II, III, . . . ) and the real code words (1, 2, 3, . . . ) in accordance with the present invention.
Figure 7:
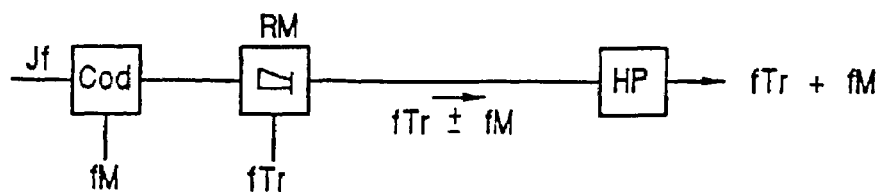
FIG. 7 shows application of the invention in relation to single sideband.

Parallel/serial converters are known and therefore will not be described further. The real serially arranged code codes can have any magnitude and can be divided into one, two or several channels. The same goes for the code elements. Naturally, the type of information and the channel reservation must be imparted to the receiving station. The band width and bit count can be established especially flexibly, is an alternating current of one frequency and one phase length is provided as code, in which the steps are constructed with respect to each other as a different size duration of periods or count of periods or different phaselengths of periods. A change is thereby also made by a change of the frequency of the code-alternating current.

Hereafter the relationships in digital coding will be explained, and then the phase- and the impulse-duration principle of the coding with one alternating current of one frequency and phase.

The methods on which this invention is based will firstly be described in greater detail. The greater the number of stages or steps in the code, the more information that can be transmitted, as can be seen from the following table:

| No of stages: | No of places: | Combinations: | Bits: |
|---|---|---|---|
| 2 | 2/3/4/5 | 4/8/16/32 | 2/3/4/5 |
| 3 | " | 9/27/81/243 | 3/4/6/7 |
| 4 | " | 16/64/256/1024 | 4/6/8/10 |
| 5 | " | 25/125/625/3125 | 4/6/9/11 |
| 6 | " | 36/216/1296/7776 | 5/7/10/12 |

If 2 90°-phase-shifted alternating currents of the same frequency, which are added for the transmission (OAM), are used for encoding, that gives 4×4=16 stages.

In the case of carrier frequency transmission because of the ⅙ power it is advantageously possible to use the single sideband method. As in accordance with the carrier formula:

$$\mu_{AM}(t) = \bar{\mu}_T \cdot \sin\omega_T t + \frac{m}{2} \cdot \bar{\mu}_T \cdot \cos(\omega_T - \omega_M)t - \frac{m}{2} \cdot \bar{\mu}_T \cdot \cos(\omega_T + \omega_M)t$$

the modulation amplitude is not also involved in the frequency, that affords narrow-band transmission.

The Phase Principle (described in U.S. Pat. No. 5,587, 797):

With this principle the phase positions of pulses for example with respect to a reference pulse or the positive or negative difference with respect to the preceding pulse are provided as stages or steps. In FIG. 6 the reference phase is the pulse B1, B2, B3, . . . . As FIG. 6a shows the pulses Bn1, Bn2, Bn3 are phase-shifted by the amount n. In FIG. 6b the pulses BN1, BN2, BN3 involve the same phase. That phase code would therefore have 2 stages Bn and BN. Those pulses are represented by integral half-periods or periods of the same frequency.

FIG. 2 shows such an encoding situation. 4 periods are associated with the reference pulse. The first pulse BNp therefore has 4 periods. If the following pulse should be trailing, it must have 5 periods. The second pulse Bnn therefore trails by the amount n. If the third pulse should remain trailing, it must contain 4 periods. The fourth pulse should again be in phase with the reference pulse, this is achieved in that it has a period fewer, that is to say 3 periods. It will also be seen that each following pulse has a change in amplitude. A doubling in the number of stages can be achieved by the pulses being caused to begin on the one hand with a positive half-period and on the other hand with a negative half-period. This is shown hatched in the drawing.

That therefore then gives at place 2, 4 stages (European patent No 0 953 246 B1 and U.S. Pat. No. 6,463,104B1).

The Pulse Duration Principle (as described in U.S. Pat. No. 6,072,829):

This principle involves using various pulse durations or pulse duration differences as stages or steps. FIG. 3 shows 3 pulse durations, D1, D2 and D3, that is to say 3 stages. It also represents a code word having 3 places or digits. The place 1 can occupy the stages D1, D2, D3, the place 2 can occupy the stages D2, D1, D3 and the place 3 can occupy the stages D3, D1, D2. With 3 stages and 3 places that gives 3 to the power 3 combinations, that is to say 3×3×3=27 combinations. If in addition the positive and negative beginning of the stages or code elements are used, that gives 6 stages. With 3 places, that then gives 216 combinations. QAM can also be used. The encoding alternating current can also be provided as a transmission alternating current.

How is the feature 'flexibility of the band widths' which is particularly emphasised in the ATM procedure achieved with the present methods? That can be done in a very very simple way. The changes in amplitude also give rise to an envelope curve. FIG. 4 shows such a curve with 2 and 3 periods as stages. In this case fH is the envelope curve. In FIG. 5 in contrast the stages are 11, 12 and 11, 12, 13 periods. In the case of both stages, there are 10 periods as filling elements. It will be seen there that the frequency of the envelope curve is much smaller, that is to say the band width is also smaller. The band width can therefore be determined by means of the filling elements. This does not require any change in the encoding frequency.

As regards also the bit rates, these can be controlled in a highly flexible manner. It will be apparent from FIGS. 2, 3 and 6 that it is possible to provide any amount of stages without the encoding frequency having to be altered. Depending on the respective transmission mode, speech, data images, the code words can be accurately matched to the required number of bits, and that naturally also applies in regard to ATM.

Figure 8:
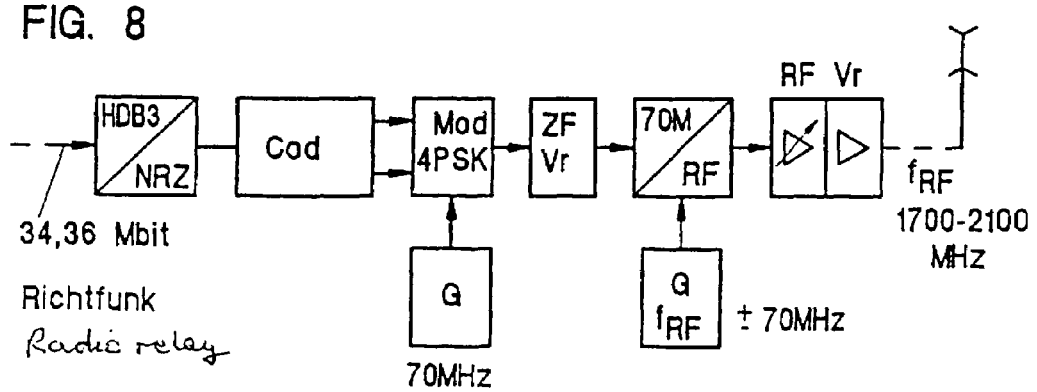
FIGS. 8 and 9 show a radio relay system conventionally and in accordance with the invention.

In order to demonstrate how great the information density is with that method, a comparison is made with a radio relay system, the circuit in principle of which is shown in FIG. 8. This is designed for 34.368 Mbits. The band width is 1700–2100 MHz with 4 PSK encoding. It will be seen that the hardware is very expensive. With a code as shown in FIG. 2, 3, 6 or 4 the predetermined band width would not be sufficient. Filling elements therefore have to be provided. With 4 stages with 10, 11, 12 and 13 periods on average 11.5 periods are required for a code element. For a 4-digit code word 4×11.5=46 periods are then required. Assuming that 1900 MHz is the encoding frequency, that then gives 1900: 46=41.3 M code words/s. With one code word there is 4 to the power 4=256 combinations, that is to say 8 bits. With 41.3 M code words that is 41.3×8=330 Mbits/s. That therefore involves 9.6 times more bits than in the conventional radio relay system. With a doubling of the stages, as set forth in FIG. 2, that then gives 8 stages. With 4 places that gives 8 to the power 4=4096 combinations=12 bits. With 41.3 code words that is 495.6 Mbits/s. That is 14.4 times as many as in the radio relay system involving conventional encoding. If the encoding procedure involves the use of 2 alternating currents at 1900 MHz which are phase-shifted relative to each other through 90° and which are added upon transmission (OAM), that gives 8×8=64 stages. With a code word involving 2 places, that gives 12 bits. Then on average 23 periods are necessary per code word so that at 1900 MHz 82.6 M code words are obtained, this is then 991 Mbits/s, that is to say 28.8 times more than in the radio relay system.

Figure 9:
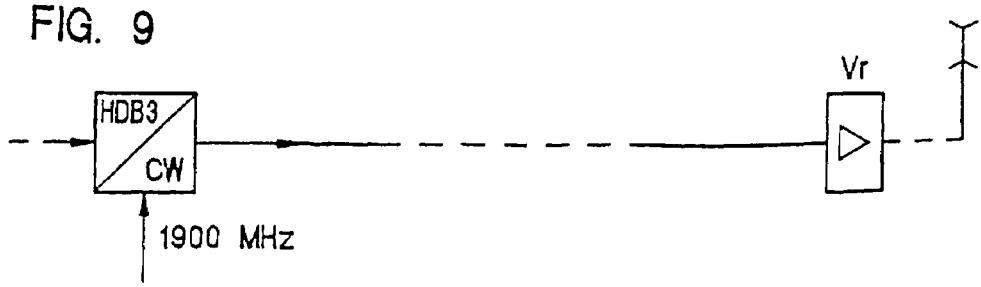

Counting members are primarily required in the encoding and decoding procedures. FIG. 9 shows the principle of a radio relay system according to the invention. The signal arriving with the HDB3 code is converted in the code converter into the code according to the invention and forwarded directly to the transmitting amplifier Vr and to the antenna.

FIG. 1 shows encoding of colour television signals. Associated with the luminance tappings L are 8 bits. Allocated to 4 luminance tappings in each case is one colour tapping I/Q or red/blue each with 6 bits. Those 12 bits are then attached to the 4×8 bits of the luminance values. In addition 1 bit for control signals and speech is also associated with each luminance tapping. Therefore 12 bits must be encoded per tapping. Therefore one carrier is sufficient for transmission.

Another method of band width and bit rate flexibility is also set forth hereinafter, which will be described in greater detail with reference to FIG. 1. As can be seen from that Figure, all colour television signals are encoded with 12 bits and transmitted. As the tapping of the colour signals is slower than that of the luminance signals, they are distributed with intermediate storage to 4 luminance values. If another kind of information is to be transmitted after conclusion of the colour television transmission, redundancy losses are to be reckoned to occur with the previous encoding procedures. FIG. 1 shows a method with which those disadvantages do not occur. In this respect the code words I, II, III, . . . are in the form of virtual code words. They are also transmitted at a predetermined frequency. In this case, associated with each parallel code element 1p to 12p is a channel, that is to say the channels 1 to 12 for the 12 code elements 1p to 12p. Code words are therefore formed serially, for example I1p, II1p, III1p, IV1p, I1p, . . . . In the case of speech 8 code elements would be serially required. Those code words can assume any size. It is only the kind of information to be transmitted that is important. The serially arranged code words are then obtained by means of a parallel/serial converter. With memories and multiplexers it is then possible for example for all 12 channels to be occupied, in that case each channel can transmit code words of different sizes.

It is possible with this method to achieve band width flexibility and bit rate flexibility without involvement in the hardware. The transmission paths are put to optimum use. Together with the wavelength multiplex method it is thought that the band width deficiency is overcome thereby for the foreseeable future.

Encoding of the information of the respective channel can be effected with an encoding alternating current. For that purpose it is also possible to provide two alternating currents of the same frequency, which are phase-shifted through 90° relative to each other and added for the transmission. It will be appreciated that it is possible to provide two alternating currents involving the same phase if they are modulated for the transmission on to two 90° phase-shifted carriers. They are then also added.

The invention claimed is:

1. A digital transmission method for combining a plurality of channels having the same or different kinds of information, for transmission over a single transmission medium, said method comprising:

forming virtual code words from a plurality of parallel code elements, wherein each of said parallel code elements occupies a respective bit position in said virtual code words, and each of the bit positions is associated with one of said plurality of channels and kind of information to be transmitted;

encoding and transmitting said virtual code words using said single transmission medium; and reconstructing said plurality of channels by forming code words from said parallel code elements occupying the same bit positions in a plurality of virtual code words.

2. The method of claim 1, wherein said code words formed from said parallel code elements for each respective channel contain different numbers of said parallel code elements.

3. The method of claim 1, wherein said code words are formed from said parallel code elements occupying a plurality of same bit positions in a plurality of virtual code words.

4. The method of claim 1, further comprising providing a first alternating current, having a constant frequency and first phase for the encoding and transmission of said virtual code words, wherein said code elements are sent in an uninterrupted series.

5. The method of claim 4, wherein said code elements are created based on characteristics of said first alternating current, wherein said characteristics of said first alternating current are selected from the group consisting of the count of like magnitude periods, the count of like magnitude half-periods, the duration of like magnitude periods, the duration of like magnitude half-periods and the phase relationship between adjacent periods.

6. The method of claim 4, further comprising providing a second alternating current added to said first alternating current, having said constant frequency and a second phase, said second phase shifted 90 degrees from said first phase, for the encoding and transmission of said virtual code words, wherein said code elements are sent in an uninterrupted series.

7. The method of claim 6, wherein said code elements are created based on characteristics of the sum of said first alternating current and said second alternating current, wherein said characteristics of said sum are selected from the group consisting of the count of like magnitude periods, the count of like magnitude half-periods, the duration of like magnitude periods, the duration of like magnitude half-periods and the phase relationship between adjacent periods.

8. The method of claim 1, wherein real code words are inserted between said virtual code words, said real code words comprising the same number of bit positions as said virtual code words and comprising code words traditionally used to transmit said kinds of information.

* * * * *